(12) United States Patent
Arai et al.

(10) Patent No.: US 7,818,119 B2
(45) Date of Patent: Oct. 19, 2010

(54) ELECTRONIC APPARATUS AND NAVIGATION IMAGE DISPLAY METHOD

(75) Inventors: Satoshi Arai, Hamura (JP); Yoshiyasu Itoh, Mitaka (JP); Rikiya Kubo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/615,091

(22) Filed: Nov. 9, 2009

(65) Prior Publication Data

US 2010/0217515 A1 Aug. 26, 2010

(30) Foreign Application Priority Data

Feb. 24, 2009 (JP) ............... 2009-041103

(51) Int. Cl.
*G01C 21/00* (2006.01)

(52) U.S. Cl. .............. 701/208; 701/1; 701/200; 701/201; 340/992; 340/995.1; 340/995.12; 340/995.14; 340/995.22; 340/995.26

(58) Field of Classification Search ........ 340/992, 340/995.1, 995.12, 995.14, 995.22, 995.26; 701/1, 200, 201, 208
See application file for complete search history.

(56) References Cited

U.S. PATENT DOCUMENTS

| | | | | |
|---|---|---|---|---|
| 6,724,382 | B2* | 4/2004 | Kenyon et al. | 345/419 |
| 7,036,085 | B2* | 4/2006 | Barros | 715/764 |
| 7,224,365 | B1* | 5/2007 | Seideman et al. | 345/473 |
| 7,246,007 | B2* | 7/2007 | Ferman | 701/200 |
| 7,342,516 | B2* | 3/2008 | Kato et al. | 340/995.19 |
| 7,613,331 | B2* | 11/2009 | Maeda | 382/113 |
| 7,698,060 | B2* | 4/2010 | Nomura | 701/208 |
| 7,711,473 | B2* | 5/2010 | Sekine et al. | 701/200 |
| 2004/0196163 | A1* | 10/2004 | Takenaga et al. | 340/995.12 |
| 2005/0050036 | A1* | 3/2005 | Araki | 707/3 |
| 2006/0106534 | A1* | 5/2006 | Kawamata et al. | 701/208 |
| 2008/0033632 | A1* | 2/2008 | Lee | 701/117 |
| 2008/0103693 | A1* | 5/2008 | Kato et al. | 701/209 |
| 2010/0017108 | A1* | 1/2010 | Nakamura et al. | 701/200 |
| 2010/0042315 | A1* | 2/2010 | Ikeuchi et al. | 701/200 |

FOREIGN PATENT DOCUMENTS

| | | |
|---|---|---|
| JP | 2002-048573 A | 2/2002 |
| JP | 2002-213980 A | 7/2002 |
| JP | 2002-260160 | 9/2002 |
| JP | 2003-207358 | 7/2003 |
| JP | 2004-020517 A | 1/2004 |
| JP | 2004-117327 A | 4/2004 |
| JP | 3987620 B2 | 7/2007 |
| JP | 2008-064517 | 3/2008 |

* cited by examiner

*Primary Examiner*—Khoi Tran
*Assistant Examiner*—Nikhil Sriraman
(74) *Attorney, Agent, or Firm*—Patterson & Sheridan, LLP

(57) ABSTRACT

According to one embodiment, an electronic apparatus comprises a storage module, a location measuring module, a communication module, and a navigation image generating module. The storage module stores image data corresponding to respective symbols, and data of simplified diagram templates in each of which positions are set on an image showing a shape of a road, symbols being placed at the respective positions. The location measuring module measures a current location. The communication module transmits the current location to an external communication apparatus and receives navigation information on a navigation point corresponding to the current location, the navigation information including a simplified diagram template identification number, symbol identification numbers, and position specification numbers. The navigation image generating module generates the navigation image by reading the simplified diagram template and the image data of the symbols, and placing the image data at positions on the simplified diagram template.

6 Claims, 11 Drawing Sheets

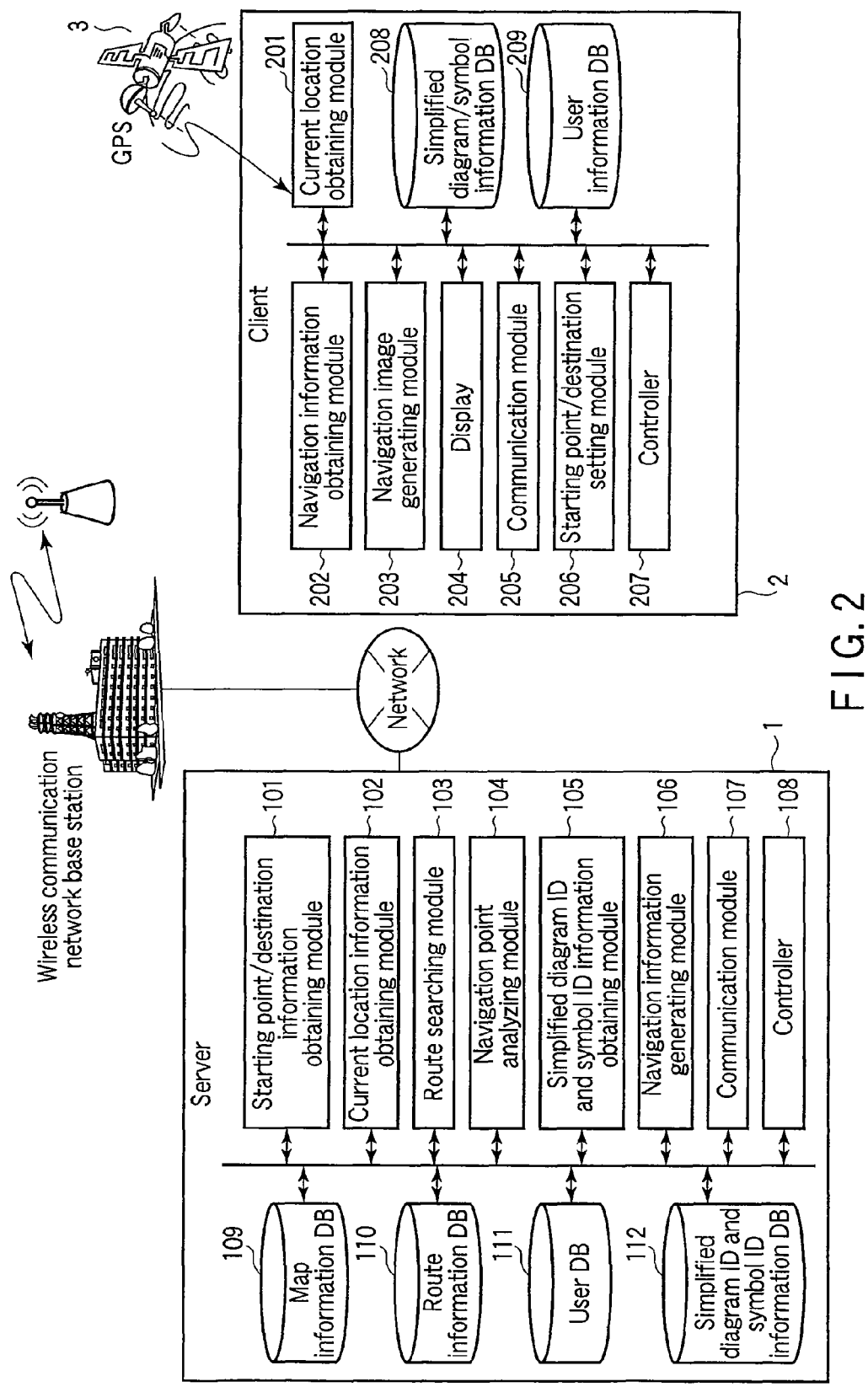
F I G. 2

| 0 ··················15 | 16 ·······················31 |
|---|---|
| Vehicle identification ID | |
| Total transmission data amount | |
| Transmission data amount for first navigation point | |
| Intervals of communication between client and server | |
| Navigation point identification number | Navigation point number |
| Latitude of navigation point | |
| Longitude of navigation point | |
| Distance between navigation points | |
| Simplified diagram number | Direction indication number |
| Presence or absence of traffic signal | Traffic jam information number |
| Road number data amount | |
| Road number location number | Road number |
| Road number location number | Road number |
| ······ | |
| Total road name data amount | |
| Road name location number | Road name data amount |
| Road name | |
| ······ | Padding 0 |
| Road name location number | Road name data amount |
| Road name | |
| ······ | Padding 0 |
| Object number data amount | |
| Object location number | Object (building and the like) number |
| Object location number | Object (building and the like) number |
| ······ | |
| Total display message data amount | |
| Display message location number | Display message data amount |
| Display message text | |
| ······ | Padding 0 |
| Display message location number | Display message data amount |
| Display message text | |
| ······ | Padding 0 |
| Total recorded voice message data amount | |
| Recorded voice message number | |
| Reproduction site | |
| ······ | ······ |
| Total voice message data amount | |
| Voice message 1 data amount | |
| Reproduction site | |
| Voice message text | |
| ······ | Padding 0 |
| Voice message 2 data amount | |
| Reproduction site | |
| Voice message text | |
| ······ | Padding 0 |

FIG. 4

| Vehicle identification ID | |
|---|---|
| Identification number of reached navigation point | Reached navigation point number |
| Latitude of current location | |
| | |
| Longitude of current location | |
| | |
| Status number | |

FIG. 5

| Vehicle identification ID |
|---|
| Total transmission data amount |
| First destination data in transmission data |
| ・・・・・・・・・・・・ |
| ・・・・・・・・・・・・ |
| Second destination data in transmission data |
| ・・・・・・・・・・・・ |
| ・・・・・・・・・・・・ |
| Third destination data in transmission data |
| ・・・・・・・・・・・・ |
| ・・・・・・・・・・・・ |

| Transmission data amount for first navigation point | |
|---|---|
| Intervals of communication between client and server | |
| Navigation point identification number | Navigation point number |
| Latitude of navigation point | |
| Longitude of navigation point | |
| Distance between navigation points | |
| Simplified diagram number | Direction indication number |
| Presence or absence of traffic signal | Traffic jam information number |
| Road number data amount | |
| Road number location number | Road number |
| Road number location number | Road number |
| ・・・・・・ | |
| Total road name data amount | |
| Road name location number | Road name data amount |
| Road name | |
| ・・・・・・ | Padding 0 |
| Road name location number | Road name data amount |
| Road name | |
| ・・・・・・ | Padding 0 |
| Object number data amount | |
| Object location number | Object (building and the like) number |
| Object location number | Object (building and the like) number |
| ・・・・・・ | |
| Total display message data amount | |
| Display message location number | Display message data amount |
| Display message text | |
| ・・・・・・ | Padding 0 |
| Display message location number | Display message data amount |
| Display message text | |
| ・・・・・・ | Padding 0 |
| Total recorded voice message data amount | |
| Recorded voice message 1 | |
| Reproduction site | |
| ・・・・・・ | |
| Total voice message data amount | |
| Voice message data amount | |
| Reproduction site | |
| Voice message text | |
| ・・・・・・ | Padding 0 |
| Voice message data amount | |
| Reproduction site | |
| Voice message text | |
| ・・・・・・ | Padding 0 |

FIG. 6

ELECTRONIC APPARATUS AND NAVIGATION IMAGE DISPLAY METHOD

CROSS-REFERENCE TO RELATED APPLICATIONS

This application is based upon and claims the benefit of priority from Japanese Patent Application No. 2009-041103, filed Feb. 24, 2009, the entire contents of which are incorporated herein by reference.

BACKGROUND

1. Field

One embodiment of the invention relates to an electronic apparatus having a navigation function and a navigation image display method applied to the electronic apparatus.

2. Description of the Related Art

In recent years, vehicle mounted apparatuses and mobile terminals in which navigation systems are mounted have been prevailing. Such a navigation system navigates a user using map information stored in a storage device provided in a terminal, in a DVD from which the information is reproduced by the terminal, or the like, as well as map information distributed by a server connected to the navigation system via a network. The map information stored in the storage device or DVD provided in the terminal may become different from the actual information as time passes. On the other hand, the map information stored in a server is updated by a server administrator or the like so that the terminal, receiving the distributed map information, can provide navigation using the map information updated with the latest information.

Jpn. Pat. Appln. KOKAI Publication No. 2002-48573 discloses a map information distributing method in which a distribution center server receives starting point information and destination information from a vehicle mounted terminal, searches for a route connecting the starting point corresponding to the starting point information and the destination corresponding to the destination information, determines map information corresponding to the route, and distributes the map information to the vehicle mounted terminal. In the map information distribution method, the distribution center server searches for the route and then determines the map to be distributed. Thus, the method allows the required map information to be exclusively distributed to the vehicle mounted terminal.

However, in the map information distribution method in Jpn. Pat. Appln. KOKAI Publication No. 2002-48573, the map information is distributed in the form of image data, resulting in high communication traffic. The increased communication traffic in turn results in enormous charges for a network in which billing is based on the communication traffic. This also increases the time required for the communication. Thus, navigation information and the like provided to the user may be delayed, thus preventing proper navigation.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary block diagram showing the configuration of the server client navigation system using the electronic apparatus according to the embodiment;

FIG. 4 is an exemplary diagram illustrating the configuration of data distributed from the server to the electronic apparatus according to the embodiment;

FIG. 5 is an exemplary diagram illustrating the configuration of data transmitted to the server from the electronic apparatus according to the embodiment;

FIG. 6 is another exemplary diagram illustrating the configuration of data distributed from the server to the electronic apparatus according to the embodiment;

DETAILED DESCRIPTION

Various embodiments according to the invention will be described hereinafter with reference to the accompanying drawings. In general, according to one embodiment of the invention, there is provided an electronic apparatus configured to display a navigation image, the apparatus comprising: a storage module configured to store image data corresponding to respective symbols to be displayed on the navigation image, and data of simplified diagram templates in each of which positions are set on an image showing a shape of a road in a simplified manner, symbols being placed at the respective positions; a location measuring module configured to measure a current location of the electronic apparatus; a communication module configured to transmit the measured current location to an external communication apparatus and to receive navigation information on a navigation point corresponding to the current location, the navigation information including a simplified diagram template identification number, symbol identification numbers, and position specification numbers; and a navigation image generating module configured to generate the navigation image by reading the simplified diagram template corresponding to the simplified diagram template identification number and the image data of the symbols corresponding to the symbol identification numbers from the storage module, and placing the read image data of the symbol at positions on the read simplified diagram template specified by the position specification numbers.

Figure 1:
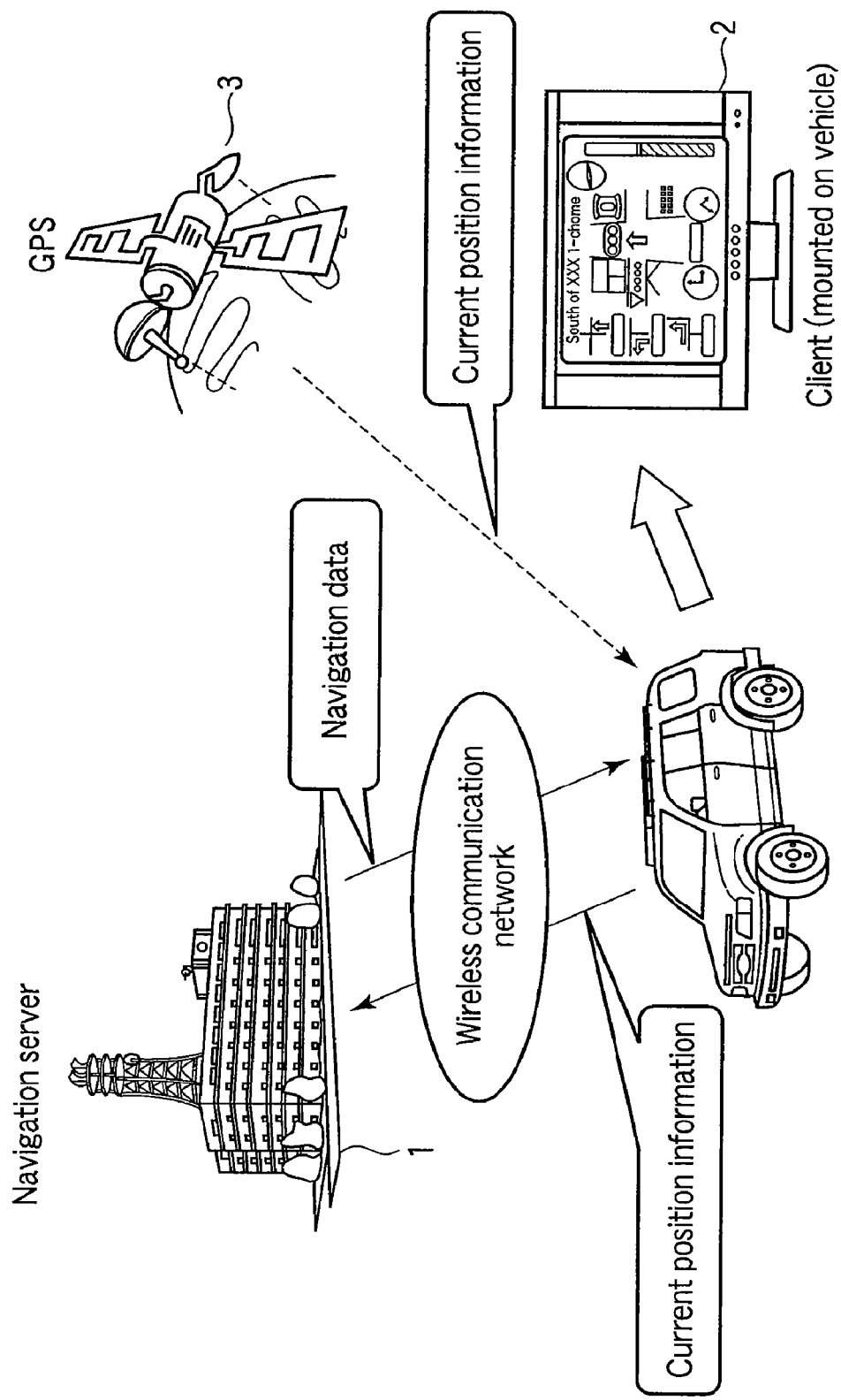
FIG. 1 is an exemplary diagram illustrating an example of a server client navigation system using an electronic apparatus according to an embodiment of the present invention.

First, with reference to FIG. 1, an example of a server client navigation system using an electronic apparatus according to an embodiment of the present invention will be described.

The electronic apparatus according to the present embodiment is, for example, a car navigation apparatus mounted in a vehicle. A client 2 that is the electronic apparatus according to the present embodiment is connected to a navigation server 1 via a wireless communication network.

The client 2 obtains current location information on the client 2 by leveraging information from a GPS satellite 3. The client 2 transmits the obtained current location information to the navigation server 1. The navigation server 1 generates navigation information on a navigation point corresponding to the current location of the client 2 based on the current location information transmitted by the client 2 and then transmits the navigation information to the client 2. The client 2 provides navigation by displaying image and outputting audio using the navigation information transmitted from the navigation server 1.

FIG. 2 is a block diagram showing the configuration of the server client navigation system using the electronic apparatus according to the present embodiment. The server 1 and the client 2 are interconnected via a network. The client 2 searches wireless network base stations provided in the network for a connectable base station and then communicates with the server 1 via the base station. The server 1 is a communication apparatus located outside the client 2.

The server 1 includes a starting point/destination information obtaining module 101, a current location information obtaining module 102, a route searching module 103, a navigation point analyzing module 104, a simplified diagram ID and symbol ID information obtaining module 105, a navigation information generating module 106, a communication module 107, a controller 108, a map information database 109, a route information database 110, a user database 111, and a simplified diagram ID and symbol ID information database 112.

The controller 108 controls the operation of each of the modules in the server 1. The controller 108 is connected to each of the processing modules and databases in the server 1.

The starting point/destination information obtaining module 101 obtains information on a starting point and a destination for which navigation is intended, from the information received from the client 2 through the communication module 107. The starting point/destination information obtaining module 101 may further obtain information on waypoints via which the client 2 travels from the starting point to the destination, from the information received from the client 2. The information on the starting point, destination, and waypoints are stored in the user database 111.

The current location information obtaining module 102 obtains the information on the current location of the client 2 from the information received from the client 2 through the communication module 107. If navigation information is distributed to the client 2, the obtained information on the current location of the client 2 is used for map matching that involves determining whether or not the current location of the client 2 matches a navigation point where navigation is being provided and whether or not the current location is on a route where navigation is being provided. The information on the current location is stored in the user database 111.

Based on the starting point and destination for the navigation for the client 2 obtained by the starting point/destination information obtaining module 101, the route searching module 103 sets a route from the starting point to the destination. If waypoints are obtained by the starting point/destination information obtaining module 101, the route searching module 103 sets a route passing through the waypoints. If routes (route candidates) from the starting point to the destination are set, the route searching module 103 determines priorities for selection of one of the route candidates based on whether or not a toll road is utilized, the time required to reach the destination, the distance to the destination, and the like by referring to the map information database 109 and the route information database 110. The route searching module 103 may determine the priorities for the route selection according to a request input by the user of the client 2 and then selects a route most satisfying the user request from the candidates. Information on the set route is stored in the user database 111.

The navigation point analyzing module 104 determines navigation points on the route set by the route searching module 103 at which point navigation is to be provided. The navigation point analyzing module 104 refers to the map information database 109 to determine the following to be navigation points: points on the set route where the course (lane) or direction is to be changed and road forks and intersections on the route where the driver is likely to get lost. The server 1 provides navigation information only on the determined navigation points to the client 2. That is, since the server 1 determines points estimated to require navigation to be navigation points and distributes navigation information only to the navigation points, a reduction in the communication traffic between the server 1 and the client 2 is realized. Information on the obtained navigation points is stored in the user database 111.

The simplified diagram ID and symbol ID information obtaining module 105 obtains the IDs of a simplified diagram template and symbols required to generate a navigation image presented to the user at each of the navigation points determined by the navigation point analyzing module 104. The simplified diagram template and symbols required to generate navigation images are determined by analyzing the shape of a road at the navigation point, buildings present at the navigation point and the like, and analyzing the traveling direction at the navigation point on the route set by the route searching module 103 by referring to the map information database 109. In each of the simplified diagram templates, frames in each of which at least one symbol or character string is placed are set on an image showing the shape of a road drawn in a simplified manner. Thus, the template is predesigned for each of differently shaped roads such as crossroads, T-shaped intersections, and Y-shaped intersections. The symbols are arranged on the simplified diagram template. The symbols include, for example, arrows showing directions, symbols for signs allowing roads to be identified, and symbols for objects such as buildings. As described above, instead of obtaining the images of the simplified diagram templates and symbols, the simplified diagram ID and symbol ID information obtaining module 105 obtains the IDs allowing the templates and the symbols to be identified.

The navigation information generating module 106 generates navigation information for each navigation point to be transmitted to the client 2. The navigation information includes simplified diagram IDs and symbol IDs obtained by the simplified diagram ID and symbol ID obtaining module 105, character strings such as names and messages displayed on the navigation image, and location numbers indicating the positions on the simplified diagram template where the symbols and character strings are arranged. That is, the navigation information transmitted to the client 2 by the server 1 is composed of data including numerical values and character strings and includes no data of images used for navigation by the client 2.

The navigation information generating module 106 generates navigation information for the navigation point corresponding to the current location of the client 2 according to the information on the current location of the client 2 obtained by the current location information obtaining module 102. That is, as the client 2 travels on the route from the starting point to the destination, the navigation information generating module 106 generates navigation information for the navigation point succeeding the navigation point where navigation is now being provided. Thus, for example, the navigation information generating module 106 uses the information on the current location of the client 2 obtained by the current location information obtaining module 102, to determine whether or not the current location of the client 2 matches the navigation point where navigation is being provided. If the current location of the client 2 falls within a tolerable range, the navigation generating module 106 generates navigation information for the next navigation point. If the current location of the client 2 falls out of the tolerable range, the navigation information generating module 106 determines the current location in detail. If the user may have taken the wrong route, the navigation generating module 106 generates navigation information indicative of this. Furthermore, the route searching module 103 determines a new route. The navigation information generating module 106 generates navigation information corresponding to the determined new route.

The communication module 107 transmits information to the client 2 and receives information from the client 2. The communication module 107 receives information on the starting point, destination, and waypoints for which the navigation is intended, information on the current location, and information on requested items relating to the route determination from the client 2. Furthermore, the communication module 107 transmits navigation information required for the client 2 to provide navigation to the client 2.

The map information database 109 stores map information in which position information expressed in latitude, longitude, and the like, is associated with objects such as roads, buildings, and facilities. Furthermore, the objects are also provided with information such as the names and attributes of the objects.

The route information database 110 stores various pieces of information required to allow the route searching module 103 to set a route (routes) from the starting point to the destination. The route information database 110 stores data, for example, road information allowing the time required to travel from the starting point to the destination to be calculated and toll information on toll roads.

The user database 111 stores information on the navigation for each user (client). Specifically, the user database 111 stores information on the starting point, destination, and waypoints for each user, information on the current location, information on the route set for the navigation, information on the navigation points along the route, the history of distribution of navigation information, and the like.

The simplified diagram ID and symbol ID information database 112 stores information on the IDs, each of which identify the simplified diagram templates and symbols used for the navigation. Referring to the simplified diagram ID and symbol ID information database 112 allows generation of the IDs of the simplified diagram templates and symbols required for the navigation.

The client 2 includes a current location obtaining module 201, a navigation information obtaining module 202, a navigation image generating module 203, a display module 204, a communication module 205, a starting point/destination setting module 206, a controller 207, a simplified diagram/symbol information database 208, and a user information database 209.

The controller 207 controls the operation of each of the modules in the client 2. The controller 207 is connected to each of the processing modules and databases in the client 2.

The starting point/destination setting module 206 sets a position input by the user to be the starting point and destination for the navigation. The user inputs the starting point and the destination by indicating appropriate positions on a map or inputting the names or the like of appropriate objects on the map, for example, using an input device such as a touch panel provided in the client 2. Furthermore, the user can similarly input waypoints on the route from the starting point to the destination. In this case, the starting point/destination setting module 206 sets the positions or names input by the user to be waypoints. Moreover, the starting point/destination setting module 206 may set whether or not any toll road is utilized, the time required to reach the destination, the distance to the destination, and the like to be conditions for setting of the route from the starting point to the destination.

The current location obtaining module 201 measures the current location of the client 2 by receiving a radio wave from the GPS satellite 3 using a GPS receiver contained in the client 2 and an externally installed GPS antenna. The communication module 205 transmits the measured current location information to the server 1 via the network. Furthermore, the navigation information is presented to the user according to the measured current location information.

The navigation information obtaining module 202 obtains navigation information from the server 1, from information received by the communication module 205.

The navigation image generating module 203 generates a navigation image to be presented to the user, based on the navigation information obtained by the navigation information obtaining module 202. As described above, the navigation information includes simplified diagram IDs, symbol IDs, character strings such as names and messages displayed on the navigation image, and location numbers indicative of positions on the simplified diagram template where the symbols and character strings are arranged. The navigation image generating module 203 obtains simplified diagram templates and image data of symbols corresponding to the simplified diagram template IDs and symbol IDs, respectively, included in the navigation information from the simplified diagram/symbol information database 208. As described above, in each of the simplified diagram templates, positions (frames) at each of which at least one symbol or character string is placed are set on an image showing the shape of a road drawn in a simplified manner. Thus, the template is created for each of differently shaped roads such as crossroads, T-shaped intersections, and Y-shaped intersections. The symbols are arranged on the simplified diagram template. The symbols include, for example, arrows showing directions, symbols for signs allowing roads to be identified, and symbols for objects such as buildings. The navigation image generating module 203 generates the navigation image by placing the obtained images of the symbols and the character strings such as the names and messages included in the navigation information, at positions on the simplified diagram template specified by the location numbers.

The display module 204 presents the navigation image to the user by displaying the navigation image generated by the navigation image generating module 203 on a display screen.

The communication module 205 transmits information to the server 1 and receives information from the server 1. The communication module 205 transmits information on the starting point, destination, and waypoints for which the navigation is intended, information on the current location, information on requested items relating to the route determination to the server 1. The information on the starting point, destination, and waypoints and the information on requested items relating to the route determination are transmitted, for example, when the user requests the navigation to be started. The information on the current location is transmitted, for example, after every predetermined time period or when any of the navigation points is reached. Furthermore, the communication module 205 receives navigation information required for the client 2 to provide navigation from the server 1.

The simplified diagram/symbol information database 208 stores the simplified diagram templates and the image data of the symbols which are used for the navigation image to be presented to the user, in association with the IDs applied to the simplified diagram templates and symbols. The image data of the symbols may be graphic data or the like.

The user information database 209 stores user identification information allowing the user (client) to be identified. The user identification information is transmitted to the server 1. If a plurality of clients are connected to the server 1, the user identification information is used to identify each of the clients so that appropriate navigation information is distributed to the client.

Now, with reference to FIG. 3, description will be given of the relationship between the point where navigation is provided by the electronic apparatus according to the present embodiment and the data distributed by the server 1.

Figure 3:
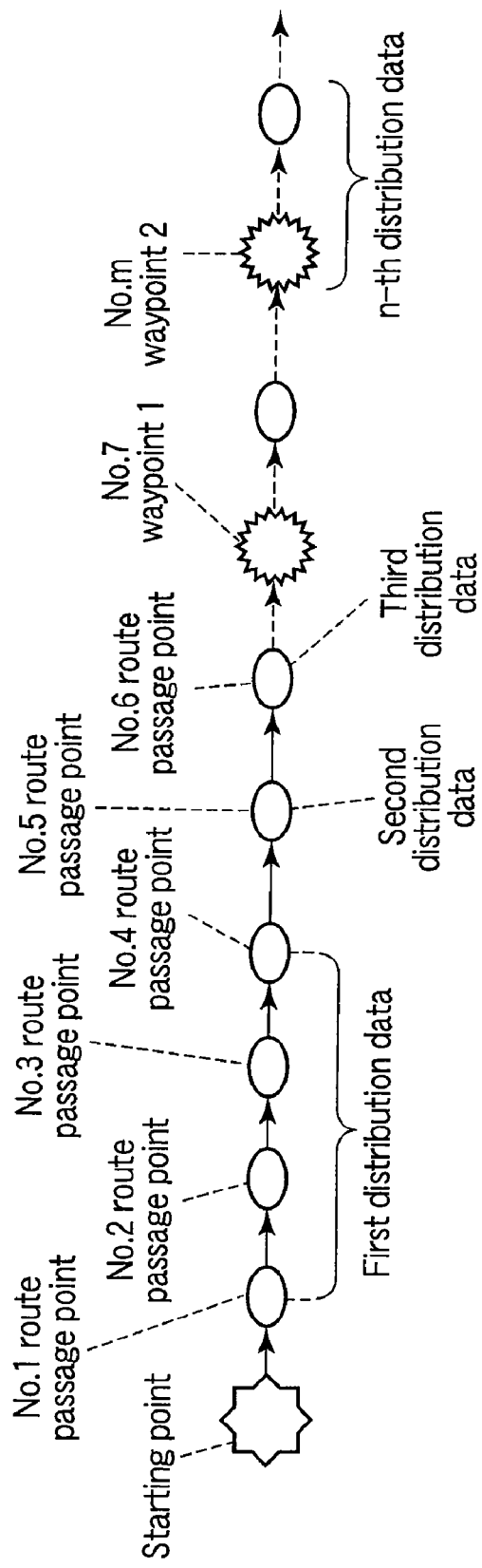
FIG. 3 is an exemplary diagram illustrating an example of the relationship between data distributed by a server and points where navigation is provided by the electronic apparatus according to the embodiment.

In FIG. 3, the points connected together by arrows show navigation points where navigation is provided. The navigation points are those points on the route for the navigation at which passage points on the route such as points the course (lane) or direction is to be changed, and road forks and intersections where the driver is likely to get lost. The waypoints set by the user are also navigation points.

The navigation information for the navigation is distributed to the client 2 by the server 1 for each navigation point. Alternatively, navigation information on a plurality of consecutive navigation points is collectively distributed to the client 2 by the server 1. The following are appropriately determined taking into account the distance between the navigation points, the status of reception of radio waves from the GPS satellite 3, and the like: whether or not the navigation information on a plurality of navigation points is collectively distributed and how many navigation points are subjected to the collective distribution of the navigation information.

In FIG. 3, first, at the starting point, navigation information corresponding to four navigation points, a No. 1 route passage point to a No. 4 route passage point, is distributed to the client 2 by the server 1 as the first distribution data. Then, when the client 2 reaches the No. 1 route passage point, navigation information corresponding to a No. 5 route passage point is distributed as the second distribution data. When the client 2 reaches a No. 2 route passage point, navigation information corresponding to No. 6 route passage information is distributed as the third distribution data. Similarly, when the client 2 reaches a No. 7 waypoint 1, navigation information corresponding to a No. m waypoint 2 is distributed as the nth distribution data.

Distributing the navigation information as described above allows the client 2 to constantly hold navigation information on the navigation point where navigation is now being provided and navigation information on a plurality of navigation points succeeding the navigation point where navigation is now being provided. That is, the client 2 can hold navigation information on a predetermined number of navigation points starting with the one where navigation is now being provided. Thus, the user can be continuously navigated.

FIG. 4 is a diagram showing an example of the configuration of data distributed to the client 2 by the server 1. The data is an example of a configuration suitable for when the client 2 includes, for example, a 32-bit CPU. Thus, each piece of data is designed such that the data amount is in units of 32 bits (4 bytes). Furthermore, the data is transmitted to the client 2 in a binary format. Such data thus enables a reduction in communication traffic compared to data in a text format such as HTML or XML.

The data distributed to the client 2 by the server 1 includes a vehicle identification ID, a total transmission data amount, the transmission data amount for the first navigation point, the communication interval between the client and the server, a navigation point identification number, a navigation point number, the latitude of the navigation point, the longitude of the navigation point, the distance between the navigation points, a simplified diagram number, a direction indication number, the presence or absence of a traffic light, a traffic jam information number, a road number data amount, a road number location number, a road number, a total road name data amount, a road name location number, a road name data amount, a road name, an object number data amount, an object location number, an object number, a total display message data amount, a display message location number, a display message data amount, a display message text, a total recorded audio message data amount, a recorded audio message number, a reproduction site, a total audio message data amount, a audio message data amount, a reproduction site, a audio message text.

The vehicle identification ID indicates an ID which enables identifying the client (user) in order to indicate the destination of data transmitted by the server 1. The data size of the vehicle identification ID is, for example, 4 bytes.

The total transmission data amount indicates the total data size of navigation information transmitted by the server 1 in bytes. The value of the total data amount is used to determine whether or not the data included in the navigation information has been accurately transmitted or received. The data size of the total data amount is, for example, 4 bytes.

The transmission data amount for the first navigation point indicates the data size of information on the first navigation point included in the navigation information in bytes. The data size for one navigation point is obtained from the value of the transmission data amount of the first navigation point. The value of the data size is also used to determine whether or not the navigation information has been accurately received. The data size of the transmission data amount for the first navigation point is, for example, 4 bytes.

The communication interval between the client and server indicates the interval at which the client 2 transmits the current location information to the server 1 in seconds. If the value of the communication intervals between the client and the server is set 0, the client 2 transmits the current location information to the server 1 upon reaching the next navigation point. The data size of the communication interval between the client and server is, for example, 4 bytes.

The navigation point identification number indicates a number which allows determination of whether the navigation point is a destination, a waypoint, or a passage point (for example, an intersection where the course (lane) or direction needs to be changed). Specifically, for example, if the navigation point is a destination, the navigation point identification number is set 100. If the navigation point is a waypoint, the navigation point identification number is set 200. If the navigation point is a passage point, the navigation point identification number is set 300. The data size of the navigation point identification number is, for example, 2 bytes.

The navigation point number indicates a number which allows identification of each of navigation points on the route for which the navigation is intended. Specifically, for example, the navigation points (destination, waypoints, and route passage points) on the route are numbered starting with number one. That is, the navigation point immediately after the starting point is provided with a navigation point number "1". Furthermore, for example, number zero is used to indicate the current location. The data size of the navigation point number is, for example, 2 bytes.

The latitude of the navigation point indicates the latitude of the navigation point specified by the above-described navigation point number. Specifically, for example, the value of the latitude is expressed in degrees. For the northern hemisphere, a plus sign (+) is applied to the latitude. For the southern hemisphere, a minus sign (−) is applied to the latitude. The data size of the latitude of the navigation point is, for example, 8 bytes.

The longitude of the navigation point indicates the latitude of the navigation point specified by the above-described navigation point number. Specifically, for example, the value of the longitude is expressed in degrees. The east longitude is provided with a plus sign (+), while the west longitude is provided with a minus sign (−). The data size of the longitude of the navigation point is, for example, 8 bytes.

The distance between the navigation points indicates the distance between the navigation point specified by the navigation point number and the preceding navigation point. If the navigation point number is 1 (the navigation point immediately after the starting point), the distance between the navigation points indicates the distance between the starting point and the navigation point immediately after the starting point. Desirably, the distance is not the length of a straight line connecting the two points together but the actual travel distance (path length). The client 2 according to the embodiment does not display a map showing road conditions. Thus, for more natural navigation for the user, the display of the distance between the navigation points is important. It is difficult for the client 2 to calculate the distance indicative of the path length. Thus, the distance between the two navigation points is calculated by the server 1, which then transmits the distance to the client 2 as navigation information. The distance between the navigation points is expressed, for example, in meters. The data size of the distance between the navigation points is, for example, 4 bytes.

The simplified diagram number indicates the identification number (ID) of a simplified diagram template used as a navigation image for the navigation point specified by the navigation point number. Specifically, for example, the simplified diagram number indicates 1 when a simplified diagram template for a crossroads is used as a navigation image. The simplified diagram number indicates 2 when a simplified diagram template for a T-shaped intersection is used as a navigation image. The simplified diagram number indicates 3 when a simplified diagram template for a Y-shaped intersection used as a navigation image. Data of the simplified diagram template used as a navigation image is stored in the client 2. The client 2 uses the simplified diagram template corresponding to the ID indicative of the simplified diagram number to generate a navigation image to be presented to the user. The data size of the simplified diagram number is, for example, 2 bytes.

The direction indication number indicates the identification number (ID) of an arrow which is indicative of a direction and is located on the simplified diagram template specified by the simplified diagram number. Image data of the arrow indicative of the direction is stored in the client 2. The data size of the direction indication number is, for example, 2 bytes.

The presence or absence of a traffic light indicates whether or not an image indicating a traffic light is located on the simplified diagram template specified by the simplified diagram number. Specifically, for example, the presence of a traffic light is indicated by 1. The absence of a traffic light is indicated by 0. The client 2 determines whether or not to draw an image of a traffic light on the simplified diagram template. The data size of the presence or absence of a traffic light is, for example, 2 bytes.

The traffic jam information indicates a value indicative of the level of a traffic jam. Specifically, for example, the lack of a traffic jam is indicated by 0. A predicted traffic jam is indicated by 1. An ongoing traffic jam is indicated by 2. An ongoing heavy traffic jam is indicated by 3. The client 2 notifies the user of a traffic jam status by changing, for example, audio information or the color of the direction indication display. The data size of the traffic jam information is, for example, 2 bytes.

The road number data amount indicates the data size of information on a road number in bytes. The road number indicates an identification number (ID) applied to a symbol such as "National Route XX" or "Prefectural Highway XX" on the simplified diagram template and allowing the road to be identified. Information on the road number includes a road number and a location number (road number location number) indicative of a position on the simplified diagram template specified by the simplified diagram number. If there is no road number to be located on the simplified diagram template, the road number data amount is set 0 bytes. The data size of the road number data amount is, for example, 4 bytes.

The road number location number indicates a position on the simplified diagram template where the corresponding road number is placed. Frames in which the respective road numbers are to be placed are preset on the simplified diagram template. Location numbers are applied to the respective frames. Thus, the road number location number indicates a location number on the simplified diagram template corresponding to the frame in which the corresponding road number is to be placed. The data size of the road number location number is, for example, 2 bytes.

The road number indicates an identification number (ID) applied to a symbol located at a position on the simplified diagram template specified by the road number location number; the symbol allows the road to be identified. The symbol allowing the road to be identified includes, for example, "National Route XX" or "Prefectural Highway XX". Specifically, if the road is a national route, the road number is set one of 1 to 999. If the road is a prefectural highway, the road number is set one of 1,000 to 1,999. If the road is a city street or the like, the road number is set one of 2,000 to 2,999. If the road is a reserved road such as an expressway, the road number is set one of 3,000 to 3,999. The client 2 reads a symbol corresponding to the ID of the road number from the storage device. The client 2 then places the symbol at a specified position on the simplified diagram template. The data size of the road number is, for example, 2 bytes.

The total road name data amount indicates the total data size of information on road names in bytes. The information on the road name includes a location number (road name location number) indicating a position on the simplified diagram template specified by the specified diagram number, a road name, and a road name data amount. The road name is, for example, "XX Way" or "XX Street". If there is no road name to be displayed on the simplified diagram template, the total road name data amount is set 0. The data size of the total road name data amount is, for example, 4 bytes.

The road name location number indicates a position on the simplified diagram template at which the road name is placed. Frames in which respective road names are to be placed are preset on the simplified diagram template. Location numbers are applied to the respective frames. Thus, the road name location number is a location number on the simplified diagram template corresponding to the frame in which the road name is to be placed. The data size of the road name location number is, for example, 2 bytes.

The road name data amount indicates the data size of the road name in bytes. The data size of the road name data amount is, for example, 2 bytes.

The road name indicates a character string of the road name in a specified character code. The character string ends with "0x00". The client 2 places the character string at a specified position on the simplified diagram template. The data size of the road name is any byte number corresponding to the character string indicating the road name. For example, if a 32-bit CPU is used, a lacking portion to perform a 4-byte alignment is padded with "0x00".

The object number data amount indicates the data size of information on an object in bytes. The information on the object includes a location number (object location number) indicative of a position on the simplified diagram template specified by the simplified diagram number and an object number. The term object refers to a landmark such as a building. If there is no object to be displayed on the simplified diagram template, the object number data amount is set 0. The data size of the object number data amount is, for example, 4 bytes.

The object location number indicates a number indicative of a position on the simplified diagram template at which the object is placed. Frames in which the respective objects are to be placed are preset on the simplified diagram template. Location numbers are applied to the respective frames. Thus, the object location number indicates a location number on the simplified diagram template corresponding to the frame in which the object is to be placed. The data size of the object location number is, for example, 2 bytes.

The object number indicates the identification number (ID) applied to a building or the like serving as a landmark allowing determination of an intersection or the like where the course is to be changed. The client 2 reads a symbol of an object corresponding to the ID of the object number from the storage device. The client 2 then places the symbol at a specified position on the simplified diagram template. For example, the logo of a shop may be used as the symbol of the object. The data size of the object number is, for example, 2 bytes.

The total display message amount indicates the total data size of information on messages displayed on the simplified diagram template in bytes. The information on the display message includes a location number (display message location number) indicative of a position on the simplified diagram template specified by the simplified diagram number, a display message data amount, and a display message text. The display message is displayed at the top of the simplified diagram template to describe the simplified diagram as a whole; the display message is, for example, "area around XX Station" or "XX Intersection". If there is no message to be displayed on the simplified diagram template, the total display message data amount is set 0. The data size of the total display message data amount is, for example, 4 bytes.

The display message location number indicates a number indicative of a position on the simplified diagram template at which the display message is placed. Frames in which the respective display messages are to be placed are preset on the simplified diagram template. Location numbers are applied to the respective frames. Thus, the display message location number indicates a location number on the simplified diagram template corresponding to the frame in which the corresponding display message is to be placed. The data size of the display message location number is, for example, 2 bytes.

The display message data amount indicates the data size of the display message in bytes. The data size of the display message data amount is, for example 2 bytes.

The display message text indicates a character string corresponding to the display message in a specified character code. The character string ends with "0x00". The client 2 places the character string at a specified position on the simplified diagram template. The data size of the display message text is any byte number corresponding to the character string of the display message text. For example, if a 32-bit CPU is used, a lacking portion to perform a 4-byte alignment is padded with "0x00".

The total recorded audio message data amount indicates the total data size of information on recorded audio messages in bytes. The information on the recorded audio message includes a recorded audio message number and a reproduction site. If there is no recorded audio message to be reproduced, the recorded audio message is set 0. The data size of the total recorded audio message data amount is, for example, 4 bytes.

The recorded audio message data amount indicates the data size of a recorded audio message in bytes. The data size of the recorded audio message data amount is, for example, 4 bytes.

The recorded audio message number indicates the number of the recorded audio message to be reproduced by the client 2. The recorded audio message is stored in the client 2 in advance and is provided with an identification number (ID). Thus, the recorded audio message number indicates the ID of one recorded message to be reproduced which is in audio messages stored in the client 2. The data size of the recorded audio message number is, for example, 4 bytes.

The reproduction site indicates information on a reproduction point where the recorded audio message is to be reproduced. The reproduced audio message is reproduced at the reproduction point before the client reaches a navigation point (destination, waypoint, or route passage point). Thus, the reproduction site indicates the distance from the navigation point to the reproduction point in meters. The data size of the reproduction site is, for example, 4 bytes.

The total audio message data amount indicates the total data size of information on the audio messages in bytes. The information on the audio messages includes a audio message data amount, a reproduction site, and a audio message text. If there is no audio message to be reproduced, the total audio message data amount is set 0. The data size of the total audio message data amount is, for example, 4 bytes.

The audio message data amount indicates the data size of a audio message in bytes. The data size of the audio message data amount is, for example, 4 bytes.

The reproduction site indicates information on the reproduction point where the audio message is to be reproduced.

The audio message is reproduced at the reproduction point before the client reaches a navigation point (destination, waypoint, or route passage point). Thus, the reproduction site is indicated by the distance from the navigation point to the reproduction point in meters. The data size of the reproduction site is, for example, 4 bytes.

The audio message text indicates a character string corresponding to the display message in a specified character code. The character string ends with "0x00". The client 2 uses a text reading function to convert the character string into speech. The data size of the display message text is any byte number corresponding to the character string of the audio message text. For example, if a 32-bit CPU is used, a lacking portion to perform 4-byte alignment is padded with "0x00".

The navigation information including the above-described data is transmitted to the client 2 by the server 1. The client 2 then provides navigation to the user. For the data items such as the road number, the road name, the object, the display massage, the recorded audio message, and the audio message, the number of data displayed (reproduced) by the client 2 varies depending on the navigation point. The data size is minimized by setting the data item with the number of items of data varying is composed of data with a variable length to deal with such variation in the number of items of data provided in the navigation information.

For the items such as the direction indication number and the presence or absence of a traffic light, the location number indicating a position on the simplified diagram template is not included in the navigation information. This is because only one image of the corresponding direction indication symbol or traffic light symbol is displayed on the simplified diagram template, so that the item relating to the location number is omitted. The location number may be added to the navigation information as required.

FIG. 5 shows an example of the configuration of data transmitted to the server 1 by the client 2 in order to notify the server 1 of the current location of the client 2. Based on the received information on the current location of the client 2, the server 1 determines whether or not the client 2 is located on the set route, that is, whether or not the user has taken the wrong road.

The data indicating the current location of the client 2 includes a vehicle identification ID, the identification number of a reached navigation point, the reached navigation point number, the latitude of the current location, the longitude of the current location, and a status number.

The vehicle identification ID indicates the ID which enables the server 1 to identify the client (user). The data size of the vehicle identification ID is, for example, 4 bytes.

The identification number of the reached navigation point indicates the number to determine whether the navigation point is a destination, a waypoint, or a passage point (for example, an intersection where the course or direction needs to be changed). Specifically, for example, if the navigation point is a destination, the navigation point identification number is set 100. If the navigation point is a waypoint, the navigation point identification number is set 200. If the navigation point is a passage point, the navigation point identification number is set 300. The data size of the navigation point identification number is, for example, 2 bytes.

The reached navigation point number indicates the number to identify each of navigation points on the route for navigation. Specifically, the navigation points (destination, waypoints, and route passage points) on the route are numbered starting with number one. That is, the navigation point immediately after the starting point is provided with a navigation point number "1". Furthermore, for example, number "0" is used to indicate the current location. The data size of the reached navigation point number is, for example, 2 bytes.

The latitude of the current location indicates the latitude of the current location obtained using the GPS satellite 3 or the like. Specifically, for example, the value of the latitude is expressed in degrees. For the northern hemisphere, a plus sign (+) is applied to the latitude. For the southern hemisphere, a minus sign (−) is applied to the latitude. The data size of the latitude of the navigation point is, for example, 8 bytes.

The longitude of the current location indicates the longitude of the current location obtained using the GPS satellite 3 or the like. Specifically, for example, the value of the longitude is expressed in degrees. The east longitude is provided with a plus sign (+), while the west longitude is provided with a minus sign (−). The data size of the longitude of the navigation point is, for example, 8 bytes.

FIG. 6 shows an example of data including navigation information on a plurality of navigation points in the data distributed to the client 2 by the server 1 shown in FIG. 4. If the data distributed to the client 2 by the server 1 includes navigation information on a plurality of navigation points, the pieces of navigation information for the respective navigation points are sequentially arranged as shown in FIG. 6.

Now, with reference to FIG. 7, an example of a simplified diagram template 400 stored in the client 2 will be described. In the simplified diagram template 400, frames in each of which at least one symbol or character string is placed are set on an image showing the shape of a road drawn in a simplified manner. Thus, the template is created for each of differently shaped roads such as a crossroads, a T-shaped intersection, and a Y-shaped intersection. The symbols are arranged on the simplified diagram template 400. The symbols include, for example, arrows showing directions, symbols for signs allowing roads to be identified, and symbols for objects such as buildings.

Figure 7:
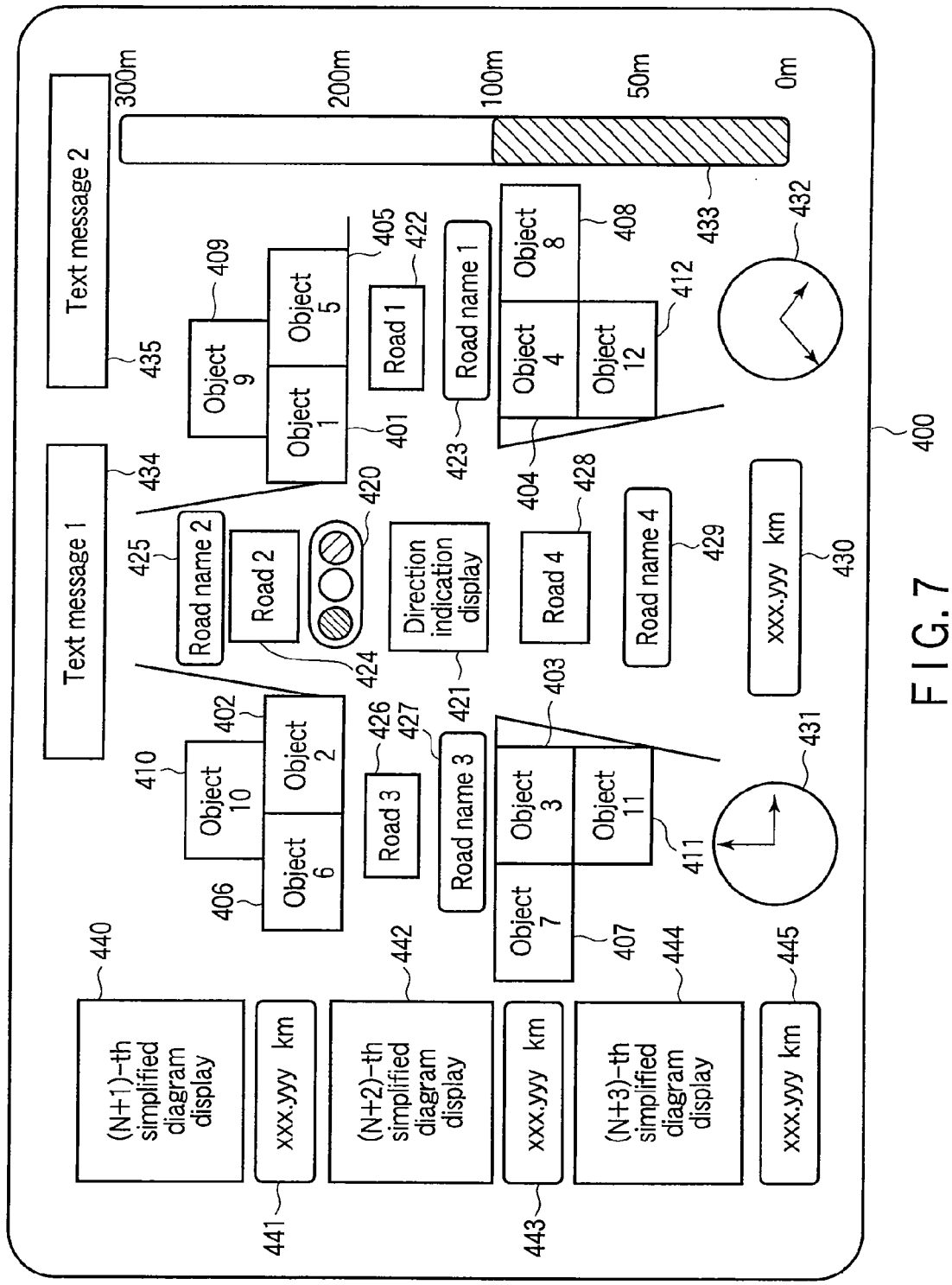
FIG. 7 is an exemplary diagram illustrating an example of a simplified diagram template stored in the electronic apparatus according to the embodiment.

In the simplified diagram template 400 shown in FIG. 7, the shape of a road showing a crossroads is drawn in a simplified manner. Frames in which respective symbols or character strings are placed are laid out in the simplified diagram template 400. The laid-out frames are provided with numbers corresponding to the respective types of objects arranged in the frames. Thus, specifying the number for each symbol or character string allows the symbol or character string to be placed at the position of the frame corresponding to the specified number.

The frames laid out on the simplified diagram template 400 shown in FIG. 7 include frames of a traffic light 420, a direction indication display 421, roads 422, 424, 426, and 428, road names 423, 425, 427, and 429, objects 401 to 412, a distance to a navigation point 430, a current time 431, a scheduled arrival time 432, a distance bar 433, text messages 434 and 435, a simplified diagram display of an N+1th navigation point 440, the distance to the N+1th navigation point 441, a simplified diagram display of an N+2th navigation point 442, the distance to the N+2th navigation point 443, a simplified diagram display of an N+3th navigation point 444, and the distance to the N+3th navigation point 445.

The traffic light 420 is a frame placed so as to display an image of a traffic light. If any traffic light is present at the navigation point, the image of traffic light is drawn on the frame of the traffic light 420.

Figure 8:
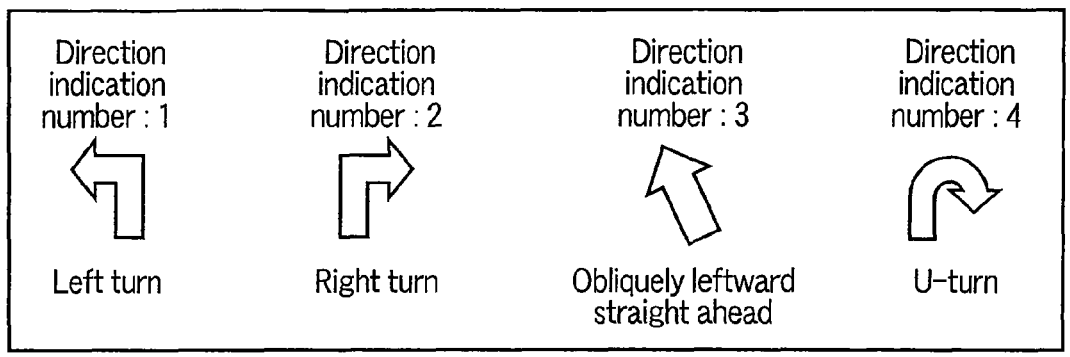
FIG. 8 is an exemplary diagram illustrating examples of symbols for direction indications stored in the electronic apparatus according to the embodiment.

The direction indication display 421 is a frame placed so as to display an image of a symbol (arrow) indicating a course at the navigation point. FIG. 8 shows examples of arrows each indicating the direction of the course. A number is applied to each of the arrows for identification. Thus, for example, if the direction indication display 421 is associated with a symbol with direction indication number 1, the client 2 reads an image of a symbol for a left turn corresponding to the direction indication number 1, from the storage device. The client 2 then displays the image of the symbol for a left turn on the frame of the direction indication display 421 on the simplified diagram template 400.

Figure 9:
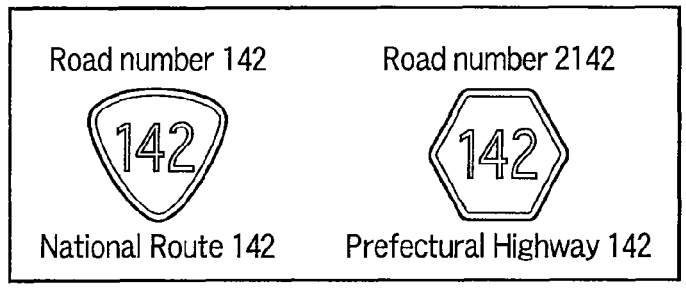
FIG. 9 is an exemplary diagram illustrating examples of symbols for roads stored in the electronic apparatus according to the embodiment.

The roads 422, 424, 426, and 428 are frames placed so as to display images of symbols each allowing a road constituting the navigation point to be identified. FIG. 9 shows examples of symbols each enabling the road to be identified. A number is applied to each of the symbols for identification. Thus, for example, if the road 422 is associated with a symbol with road number 2142, the client 2 reads an image of a symbol for "Prefectural Highway 142" corresponding to the road number 2142 from the storage device. The client 2 then displays the image of the symbol for "Prefectural Highway 142" on the frame of the road 422 on the simplified diagram template 400.

The road names 423, 425, 427, and 429 are frames placed so as to display strings indicative of the names of the roads constituting the navigation point. Thus, for example, if the road name 423 is associated with a character string "XX Way", the client 2 displays the character string "XX Way" on the frame of the road name 423 on the simplified diagram template.

Figure 10:
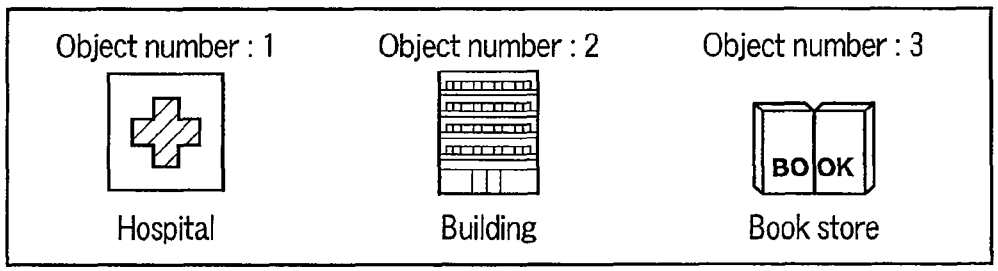
FIG. 10 is an exemplary diagram illustrating examples of symbols for objects stored in the electronic apparatus according to the embodiment.

The objects 401 to 412 are frames placed so as to display symbols for objects indicating landmarks such as buildings which are constructed along the road at the navigation points. FIG. 10 shows examples of symbols for objects. The symbols for objects include map symbols indicative of a hospital and a police office and the logos of shops. Furthermore, for example, if the object 401 is associated with object number 1, the client 2 reads an image of a symbol for a hospital corresponding to the object number 1, from the storage device. The client 2 then displays the image of the symbol for a hospital on the frame of the object 401 on the simplified diagram template 400.

The distance to the navigation point 430 is a frame placed so as to display a numerical value indicative of the distance from the current location to the navigation point. The client 2 displays the actual travel distance between the navigation points included in the navigation information transmitted by the server 1, on the frame of the distance to the navigation point 430 as the distance from the current location to the navigation point.

The current time 431 is a frame placed so as to display, for example, an image of a clock showing the current time. The client 2 displays the image of the clock showing the current time, on the frame of the current time 431.

The distance bar 433 is a frame placed so as to display an image of a bar showing the distance from the current location to the navigation point. The client 2 displays the image of the bar showing the distance from the current location to the navigation point, on the frame of the distance bar 433.

The text messages 434 and 435 are frames placed so as to display character strings corresponding to messages such as "area around XX Station" and "1-chome, XX" which describe a navigation image as a whole. The client 2 displays specified character strings on the frames of the text messages 434 and 435.

The simplified diagram display of the N+1th navigation point 440 is a frame placed so as to display a navigation image of a navigation point succeeding the navigation point (Nth navigation point) where navigation is now being provided, that is, the N+1th navigation point. The client 2 generates a navigation image based on the N+1th navigation information received from the server 1. The client 2 then displays the generated navigation image on the frame of the simplified diagram display of the N+1th navigation point 440. The displayed navigation image may be an auxiliary one in which only the simple shape of a road and an arrow symbol for direction indication display are drawn. In this case, the client 2 stores auxiliary simplified diagram templates and auxiliary direction indication symbols which are required to create an auxiliary navigation image.

The distance to the N+1 navigation point 441 is a frame placed so as to display a numerical value indicating the distance from the Nth navigation point to the N+1th navigation point. The client 2 displays the actual travel distance between the navigation points included in the navigation information transmitted by the server 1, on the frame of the distance to the N+1 navigation point 441 as the distance from the Nth navigation point to the N+1th navigation point.

By displaying navigation information on the next navigation point in the simplified diagram of the N+1th navigation point 440 and in the distance to the N+1th navigation point 441, the navigation information can be continuously provided to the user to appropriately navigate the user even if the Nth navigation point is close to the N+1th navigation point.

The following are frames similarly placed so as to display navigation information on the N+2th navigation point and navigation information on the N+3th navigation point; the simplified diagram of the N+2th navigation point 442 and the distance to the N+2th navigation point 443, and the simplified diagram of the N+3th navigation point 444 and the distance to the N+3th navigation point 445.

Figure 11:
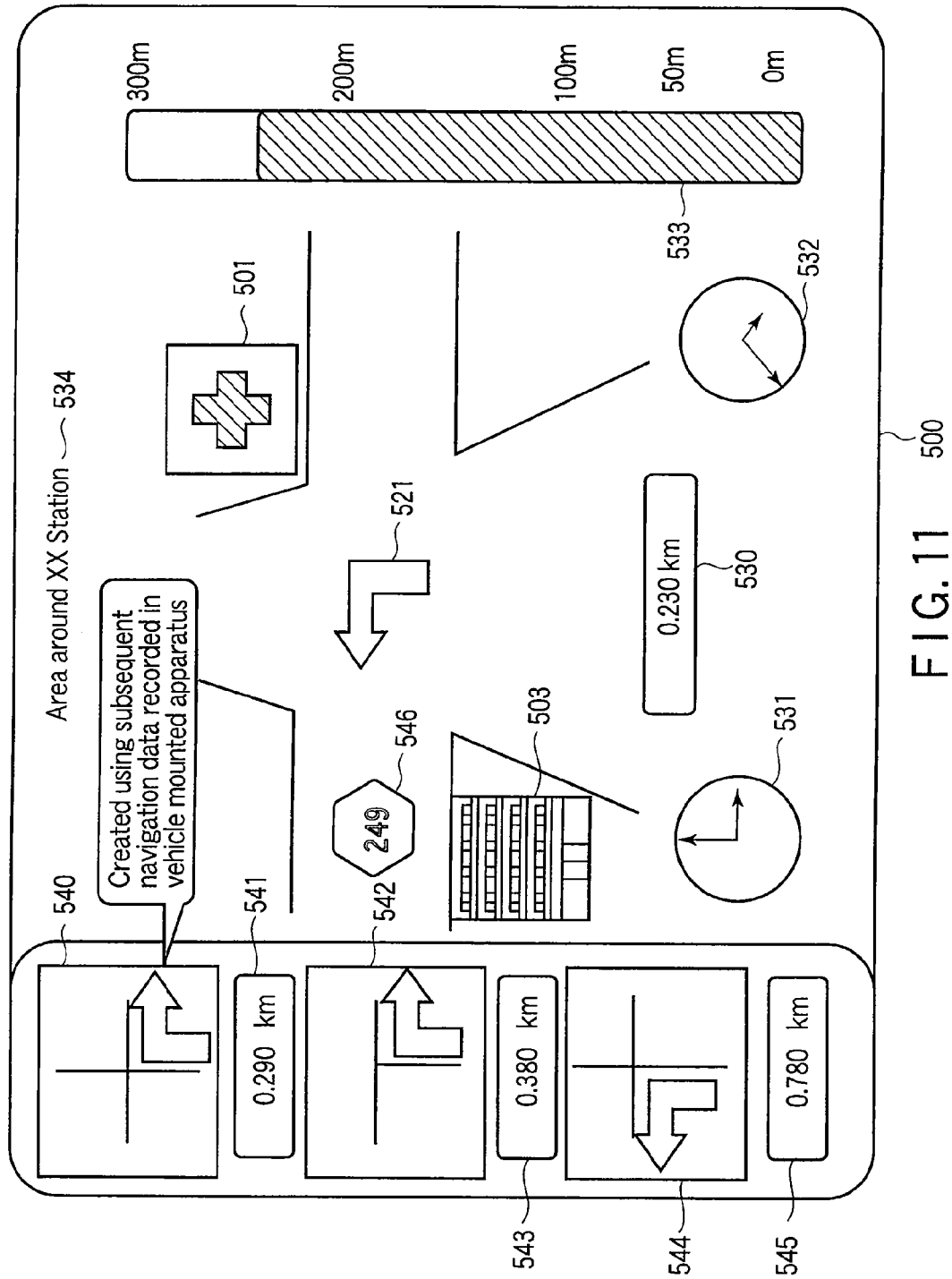
FIG. 11 is an exemplary diagram illustrating an example of an image for navigation generated by the electronic apparatus according to the embodiment.

FIG. 11 shows an example of a navigation image generated by the client 2. The client 2 generates a navigation image based on navigation information received by the server 1. As described above, the navigation information includes a simplified diagram ID, symbol IDs, character strings such as names and messages displayed on the navigation images, and location numbers indicating positions on the simplified diagram template at which the respective symbols and character strings are placed. The navigation image generating module 203 of the client 2 obtains the simplified diagram template and the image data of the symbols corresponding to the simplified diagram ID and symbol IDs, respectively, included in the navigation information from the simplified diagram/symbol information database 208. The navigation image generating module 203 generates a navigation image in which images of the obtained symbols and the character strings such as the names and messages included in the navigation information are arranged at the positions on the simplified diagram template specified by the location numbers.

For a navigation image 500 shown in FIG. 11, based on navigation information distributed by the server 1, the client 2 reads a simplified diagram template in which a crossroads corresponding to the simplified diagram ID in the navigation information is drawn, from the simplified diagram/symbol information database 208. Furthermore, the client 2 reads image data of the symbol for a left turn and the symbol for a hospital corresponding to the symbol IDs in the navigation information, from the simplified diagram/symbol information database 208. The client 2 then generates a navigation image by displaying, for example, the read image data of the symbols and the character strings described in the navigation information, at specified positions on the read simplified diagram template. Thus, in the navigation image 500 in FIG. 11, the left turn arrow is displayed near the center of the intersection of a crossroads, and an image of a symbol indicative of that the road after the left turn is Prefectural Highway 249 is displayed. Furthermore, images of symbols indicative of a hospital and a building are displayed along the road to provide landmarks for the navigation. Similarly, in the navigation image 500 in FIG. 11, various pieces of text information and images are displayed for the navigation. That is, the client 2 generates a navigation image containing an image showing the shape of the road and images of the symbols, from the navigation information transmitted by the server 1 and including the simplified diagram template ID, symbol IDs and character string information. The client 2 stores the simplified diagram template and the image data of the symbols, including image information of a large data size. Thus, the navigation information distributed to the client 2 by the server 1 has only to include numerical values indicating the simplified diagram template ID and symbol IDs and text information made up of character strings. Thus, the server client navigation system using the electronic apparatus according to the embodiment enables a reduction in the communication traffic between the server 1 and the client 2 compared to a system in which the server 1 distributes the navigation image itself to the client 2. For example, a driving direction system distributing image data to cellular phones requires several kilobytes of communication traffic per distribution. However, the navigation information distributed to the client 2 by the server 1 according to the embodiment is only several hundred bytes per navigation point.

Figure 12:
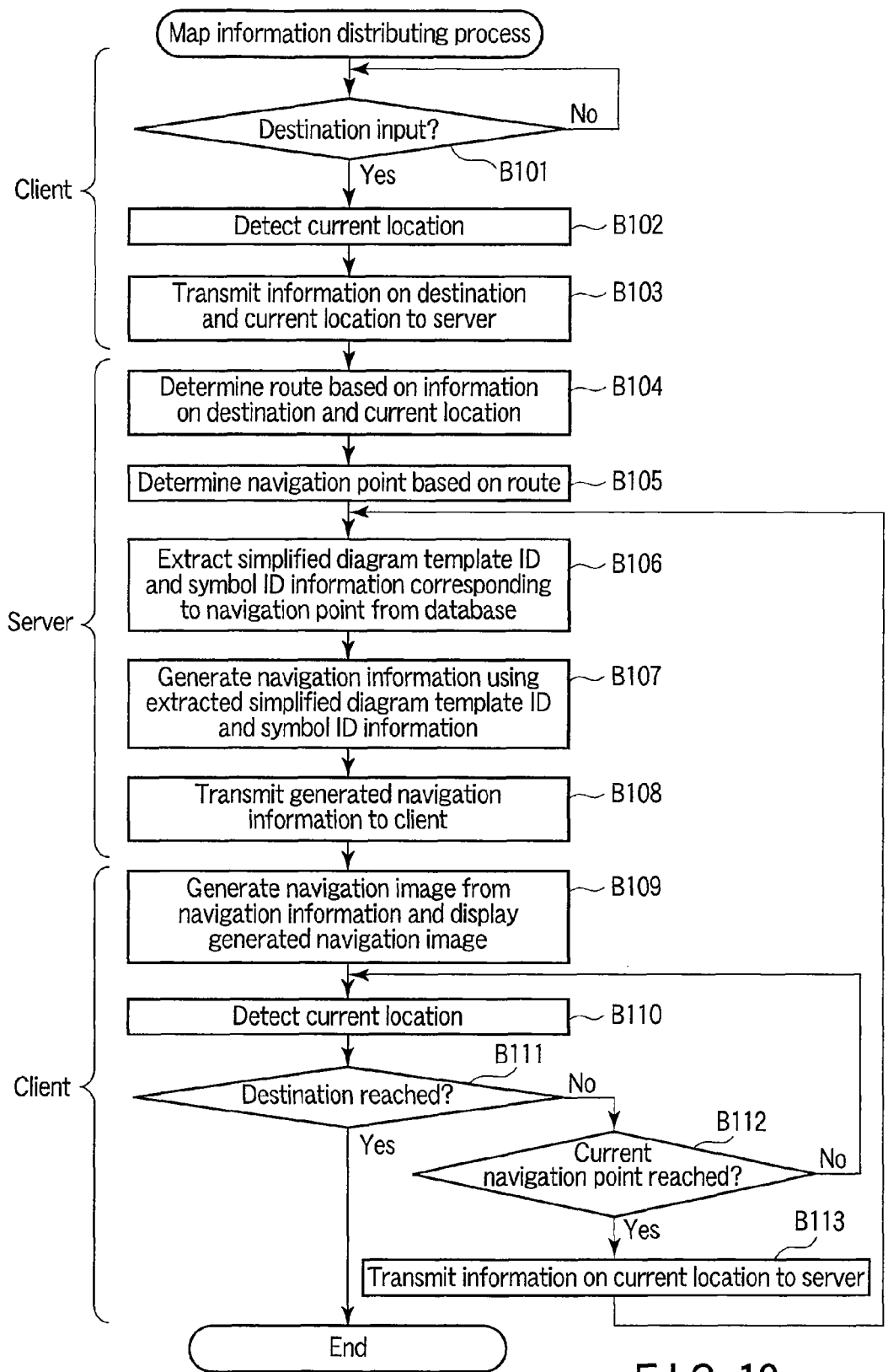
FIG. 12 is an exemplary flowchart illustrating a map information distributing process executed by the server client navigation system using the electronic apparatus according to the embodiment.

FIG. 12 is a flowchart illustrating the procedure of a map information distributing process by the server client navigation system.

First, the client 2 determines whether or not the user has input a destination for navigation (block B101). The user inputs the destination by, for example, specifying a position on a map displayed on the screen of the client 2 or selecting the name of the destination from a list.

If the user has input the destination for navigation (YES in block B101), the client 2 receives a radio wave from the GPS satellite 3 to measure the current location of the client 2 (block B102). The client 2 then transmits information on the destination and information on the current location to the server 1 (block B103).

The server 1 determines a route from a starting point corresponding to the current location, to the destination by referring to the route information database 110 based on the information on the destination and the information on the current location (block B104). Then, the server 1 determines navigation points along the route at which navigation is provided (block B105). The navigation points include waypoints and intersections (including road forks) where the course or direction needs to be changed (a right turn, a left turn, or the like).

The server 1 obtains a simplified diagram ID and symbol IDs corresponding to each of the determined navigation points by referring to the simplified diagram ID and symbol ID database 112 (block B106). The simplified diagram ID and symbol IDs corresponding to each of the navigation points are the IDs of the simplified diagram template and symbols required to generate a navigation image to be presented to the user at the navigation point. The simplified diagram template and symbols required to generate a navigation image are determined by, for example, referring to the map information database 109 to analyze the shape of a road at the navigation point and buildings and the like present at the navigation point, and analyzing, for example, the traveling direction at the navigation point on the route set by the route searching module 103. To allow the client 2 to provide navigation, the server 1 generates navigation information to be distributed to the client 2 by the server 1 (block B107). The navigation information includes the obtained simplified diagram ID (simplified diagram template identification number) and symbol IDs (symbol identification numbers), character stings displayed on the simplified diagram, and location numbers (position specification numbers) indicating positions on the simplified diagram at which the symbols and character strings are placed. The server 1 distributes the generated navigation information to the client 2 (block B108).

The client 2 generates a navigation image using the received navigation information and displays the navigation image on the screen (block B109). Furthermore, the client 2 also outputs audio assistance or the like according to the received navigation information.

The client 2 obtains the current location of the client 2 using information from the GPS satellite 3 (block B110). The client 2 determines whether or not the client 2 has reached the destination, based on the obtained current location (block B111). If the client 2 has reached the destination (YES in block B111), the client 2 terminates the navigation.

If the client 2 has not reached the destination (NO in block B111), the client 2 determines whether or not the client 2 has reached the navigation point where navigation is now being provided (the navigation image is being displayed) (block B112). If the client 2 has reached the navigation point where navigation is now being provided (YES in block B112), the client 2 transmits information on the current location to the server 1 (block B113). The server 1 distributes navigation information on the next navigation point to the client 2 by executing the procedure from block B106 to block B108 for the next navigation point. The client 2 provides navigation for the next navigation point using the received navigation information on the next navigation point.

If client 2 has not reached the navigation point where navigation is now being provided (NO in block B112), the client 2 continues to display the navigation image of the current navigation point. The client 2 thus executes the procedure in block B110 and the subsequent blocks.

The above-described processing allows the navigation information corresponding to the current location of the client 2 to be distributed to the client 2 by the server 1. The client 2 can thus provide appropriate navigation to the user.

Figure 13:
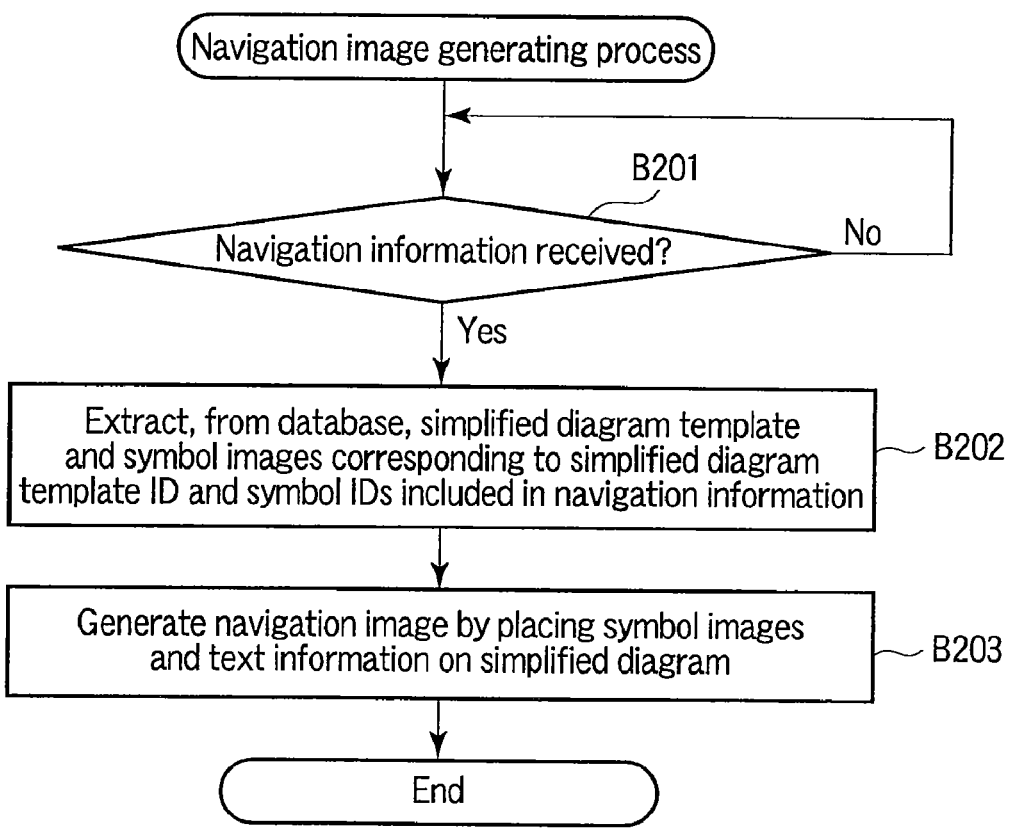
FIG. 13 is an exemplary flowchart illustrating the procedure of a navigation image generating process executed by the server client navigation system using the electronic apparatus according to the embodiment.

Now, with reference to the flowchart in FIG. 13, the procedure of the navigation image generating process included in the procedure in block B109 will be described in detail.

First, the client 2 determines whether or not the client 2 has received navigation information from the server 1 (block B201). If the client 2 has received navigation information from the server 1 (YES in block B201), the client 2 reads the simplified diagram template and the image data of the symbols corresponding to the simplified diagram ID and symbol IDs, respectively, included in the navigation information, from the simplified diagram/symbol information database 208 (block B202). The client 2 then generates a navigation image by placing the image data of the symbols and text information at positions on the read simplified diagram template specified by the location numbers (block B203).

In the above-described processing, the client 2 generates a navigation image based on the navigation information received from the server 1. The simplified diagram template and the image data of the symbols which are required to generate the navigation image are pre-stored in the database provided in the client 2. The client 2 generates a navigation image by reading the simplified diagram template and the image data of the symbols from the database as required.

As described above, in the embodiment, since the image information for navigation is held on the client 2 side, the communication traffic required for the sever 1 to distribute navigation information to the client 2 can be reduced. The client 2 holds simplified diagram templates and image data of symbols as image information for navigation; in each of the simplified diagram templates, frames in each of which at least one symbol or character string is placed are set on an image in which the shape of a road is drawn in a simplified manner. The server 1 transmits navigation information required for navigation for the navigation point and including the ID of a simplified diagram template, the IDs of symbols, character strings such as names to be displayed on the screen, and numbers indicating positions on the simplified diagram template at which the symbols and character strings are placed, to the client 2. The client 2 reads the simplified diagram template corresponding to the simplified diagram template ID and the image data of the symbols corresponding to the symbol IDs, from the storage device based on the received navigation information. The client 2 thus generates a navigation image in which the symbols and the character strings are arranged on the simplified diagram template. Thus, the server 1 transmits the navigation information made up only of the numerical values and character strings, instead of the image data required for the navigation, to the client 2. This enables a reduction in the communication traffic required for the server 1 to distribute navigation information to the client 2.

In the embodiment, a method has been described in which the destination for navigation is set and intersections and waypoints where the course or direction is changed are determined to be navigation points so that navigation information on the determined navigation points is distributed to the client 2 by the server 1. However, a point such as an intersection around the client 2 may be determined to be a navigation point simply based on information such as the current location and advancing direction of the client 2 so that navigation information corresponding to the navigation point is distributed to the client 2 by the server 1.

Furthermore, in the description of the embodiment, although the server 1 comprises one computer, the server 1 may comprise computers connected together.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus configured to display a navigation image, the apparatus comprising:
   a storage module configured to store image data corresponding to respective symbols to be displayed on the navigation image, and data of simplified diagram templates in which positions are set on an image showing a shape of a road in a simplified manner, symbols being placed at the respective positions;
   a location measuring module configured to measure a current location of the electronic apparatus;
   a communication module configured to transmit the measured current location to an external communication apparatus and to receive navigation information on a navigation point corresponding to the current location from the external communication apparatus, the navigation information including a simplified diagram template identification number, symbol identification numbers, and position specification numbers; and
   a navigation image generating module configured to generate the navigation image by reading the simplified diagram template corresponding to the simplified diagram template identification number and the image data of the symbols corresponding to the symbol identification numbers from the storage module, and placing the read image data of the symbol at positions on the read simplified diagram template specified by the position specification numbers.

2. The electronic apparatus of claim 1, further comprising a destination setting module configured to set a starting point and a destination for navigation,
   wherein the communication module is configured to transmit information indicative of the starting point and the destination and the measured current location to the external communication apparatus and to receive navigation information on the navigation point corresponding to the current location from the external communication apparatus, the navigation information including the simplified diagram template identification number, the symbol identification numbers, and the position specification numbers, for each navigation point on a route from the starting point to the destination at which navigation is provided.

3. The electronic apparatus of claim 2, wherein the navigation point comprises a point on the route where a course needs to be changed, a road fork, or an intersection.

4. The electronic apparatus of claim 1, wherein the navigation information comprises information on character strings placed on the simplified diagram template.

5. A navigation image display method of displaying a navigation image on a display device of an electronic apparatus, the electronic apparatus being configured to store image data corresponding to respective symbols to be displayed on the navigation image, and data of simplified diagram templates in each of which positions are set on an image showing a shape of a road in a simplified manner, symbols being placed at the respective positions, the method comprising:
   measuring a current location of the electronic apparatus;
   transmitting the measured current location to an external communication apparatus and receiving navigation information on a navigation point corresponding to the current location from the external communication apparatus, the navigation information including a simplified diagram template identification number, symbol identification numbers, and position specification numbers; and
   generating the navigation image by reading the simplified diagram template corresponding to the simplified diagram template identification number and the image data of the symbols corresponding to the symbol identification numbers from the electronic apparatus and placing the read image data of the symbols at positions on the read simplified diagram template specified by the position specification numbers.

6. The method of claim 5, further comprising setting a starting point and a destination for navigation,
   wherein the transmitting the measured current location comprises
   transmitting information indicative of the starting point and the destination and the measured current location to the external communication apparatus, and receiving navigation information on the navigation point from the external communication apparatus, the navigation information including the simplified diagram template identification number, the symbol identification numbers, and the position specification numbers, for each navigation point on a route from the starting point to the destination at which navigation is provided.

* * * * *